3,226,184
MANUFACTURE OF SOLID AMMONIUM PHOSPHATES
Isaac Allan Brownlie and George Andrew Wemyss, Edinburgh, Scotland, assignors to Scottish Agricultural Industries Limited, Edinburgh, Scotland, a corporation of Great Britain
No Drawing. Filed Aug. 17, 1962, Ser. No. 217,539
Claims priority, application Great Britain, Sept. 8, 1961, 23,399/61
12 Claims. (Cl. 23—107)

The present invention relates to a process for the production of a solid composition comprising ammonium phosphate of desired N:P ratio.

Monoammonium phosphate, $NH_4H_2PO_4$, and diammonium phosphate, $(NH_4)_2HPO_4$, and mixtures of these salts, are desirable ingredients of fertilisers because they supply both nitrogen and phosphorus, two elements which are essential to plant growth. An ammonium phosphate is characterized by the atomic ratio of nitrogen to phosphorus which it contains, commonly termed the N:P atomic ration; thus mono-ammonium phosphate has an N:P atomic ratio of 1.0 and an equimolar mixture of mono-ammonium phosphate and diammonium phosphate has an N:P atomic ratio of 1.5. The N:P atomic ratio of a composition containing nitrogen or phosphorus compounds in addition to ammonium phosphate is the N:P atomic ratio of only the ammonium phosphate component.

Commonly, if ammonium phosphates are incorporated into granular fertilisers, the granules are formed from a liquid slurry of the ammonium phosphate. Solid ammonium phosphates have seldom been used in the manufacture of granular mixed fertilisers because they have generally been available in forms which are difficult to granulate. We have now found a process for the production of a solid comprising ammonium phosphate highly suitable for instance for incorporation into fertiliser compositions for the production of granular mixed fertilisers, for example, by the process claimed in our co-pending British applications Nos. 32,398/61 and 23,521/62.

According to the present invention the process for the production of a solid product comprising ammonium phosphate of N:P atomic ratio 0.95 to 1.6 comprises adding phosphoric acid and ammonia to an aqueous slurry of ammonium phosphate of flowable consistency at the temperature of working and having an N:P atomic ratio of between 1.2 and 1.8 in such proportions as to form more slurry of substantially the same composition and of flowable consistency, removing from the aqueous slurry of ammonium phosphate an amount substantially equivalent to that produced by the addition of the phosphoric acid and ammonia, and mixing the amount removed with a second liquid or slurry capable of ammoniation by it and in such proportions that the ammonium phosphate of the resulting product has a pre-determined and lower N:P atomic ratio than that of the original aqueous slurry of ammonium phosphate and is solid at ambient temperatures, said mixing being carried out under such conditions as to effect agitation and forward transport involving repeated exposure of fresh surfaces of the resulting mixture to facilitate evaporation of moisture from said mixture.

If said pre-determined N:P atomic ratio is less than that required for the desired end-product then, subsequent to the mixing of the removed ammonium phosphate slurry with said second liquid or slurry, ammoniation is effected, for example in the apparatus used for said mixing, after sufficient moisture is removed to prevent liquefaction during said ammoniation, to produce a solid end-product of desired N:P atomic ratio. This embodiment of the invention is particularly preferred when the concentration of phosphoric acid used is so great that the ammoniation to an N:P atomic ratio greater than that of the desired end-product would result in a slurry of too great viscosity for easy flow prior to admixture with said second liquid or slurry.

Below an N:P atomic ratio of around 0.95 ammonium phosphate becomes decidedly acid, corrosive and hygroscopic owing to the presence of free phosphoric acid. Above an N:P atomic ration of around 1.6 the equilibrium ammonia vapour pressure of ammonium phosphate increases substantially giving rise to difficulties in utilisation.

It is to be appreciated that without highly efficient recovery of ammonia by an acid scrubber the production of an aqueous slurry of ammonium phosphate of N:P atomic ratio greater than about 1.8 usually results in substantial loss of ammonia and that for an aqueous slurry of ammonium phosphate of N:P atomic ratio below about 1.2 the temperature rise and other effects of admixture with a second liquid or slurry capable of ammoniation by said first mentioned slurry are generally insufficient to promote the evaporation and crystallization necessary for the production of the desired product solid at ambient temperatures.

By forward transport is meant the moving of the progressively drier mixture of the two liquids or slurries away from the point of their mixing.

By the term "solid" is meant an intimate mixture of solid particles and saturated aqueous solution of soluble ingredients wherein the proportion of solution is less than that at which there is substantial separation of liquid from the product under a pressure of 6 p.s.i.g. which approximates to usual storage conditions. The maximum levels of moisture content vary with solid particle size, being lower with larger particles, and also with the chemical composition. Examples of this latter variation for products made from Nauru phosphate rock are given in the following table.

PRODUCT COMPRISING SOLID AMMONIUM PHOSPHATE

| N:P atomic ratio of ammonium phosphate | Other component | N:$P_2O_5$ weight ratio | Maximum moisture content (percent) at 6 p.s.i.g. |
|---|---|---|---|
| 0.95 | | ~1:4 | 6 |
| 1.0 | Ammonium sulphate | 1:2 | 2 |
| 1.0 | Ammonium nitrate | 1:2 | 0 |
| 1.0 | do | 1:1 | 8 |
| 1.0 | Urea | 1:2 | 8 |
| 1.0 | do | 1:1 | 6 |

By the N:$P_2O_5$ weight ratio of a product is meant the ratio of the total weights of N and $P_2O_5$ contained in the product in any chemical form.

It is to be understood that the moisture introduced into the process of the invention is not to be so high as to prevent the end-product being solid at ambient temperatures.

The initial ammoniation steps allows the use, if necessary, of phosphoric acid of higher concentration than can normally be ammoniated to N:P atomic ratios of 1.2 to 1.8 without a tendency to solidify at lower N:P atomic ratios and retard further reaction.

Preferably the ammonia added is either in the gaseous or anhydrous liquid form but ammonia solutions are also suitable so long as the water introduced thereby does not cause the product moisture content to exceed the limiting value above which the product ceases to be a solid at ambient temperatures.

The second liquid or slurry may comprise a mineral acid other than phosphoric acid, for example, nitric acid or sulphuric acid, either alone or mixed with one another and/or with phosphoric acid. This acid or these acids may be partially ammoniated. The use of such partially-ammoniated acid or acids is particularly suited in the process of the invention for the production of products solid at ambient temperature having an N:P$_2$O$_5$ weight ratio of, for example, 1:2, 1:1 or 2:1. The table above shows that such products have a lower maximum moisture content than the product of N:P$_2$O$_5$ weight ratio~1:4 which is substantially ammonium phosphate.

Said products of N:P$_2$O$_5$ weight ratio of, for example, 1:2, 1:1 and 2:1, may also be produced by introducing an ammonium salt either as a solid or a concentrated aqueous solution at, or following, the addition of said second liquid or slurry. Additionally or alternatively nitrogen compounds, as for example, urea, may be introduced as a solid or concentrated aqueous solution at, or following, the addition of said second liquid or slurry.

A proportion of the aforesaid end-product may be introduced at or after the mixing of said liquids or slurries to assist in the rapid evolution of moisture by altering the consistency of the mixture of said liquids or slurries to allow greater exposure of surface of the mixture in apparatus used for mixing and moisture disengagement.

Further, other solid materials such as muriate of potash may be added at, or following the point of addition of said second liquid or slurry to give a solid product containing nitrogen, phosphorus and potassium.

Preferably, following the point of mixing of said liquids or slurries, there no application of external heat excepting heat which may be introduced by any materials added after said point of mixing.

In accordance with an embodiment of the invention a solid ammonium phosphate of N:P atomic ratio in the range 0.95 to 1.6 is produced by adding "wet-process" phosphoric acid P$_2$O$_5$ content in the range 35% to 54% P$_2$O$_5$ and gaseous ammonia to an aqueous slurry of ammonium phosphate, the N:P atomic ratio of the slurry being in the range 1.2 to 1.8 and the moisture content of the slurry being in the range 10% to 20%, in such proportions as to form more slurry of substantially the same composition, simultaneously removing from the slurry an amount substantially equivalent to that produced by the addition of the phosphoric acid and ammonia, and mixing the removed amount of slurry with further phosphoric acid in such proportions that the product so formed is of the desired N:P atomic ratio and under such conditions that the moisture content of the product is so reduced by evaporation, caused, for example, by the heat of reaction, that the product is solid at ambient temperature. The process of the invention is illustrated in the following examples.

*Example I*

A solid product of ammonium phosphate of average composition 10.9% N, 50.8% P$_2$O$_5$, 9.6% H$_2$O and N:P atomic ratio 0.95 is made at a rate of 0.6 tons per hour by the addition of 40% P$_2$O$_5$ "wet-process" phosphoric acid at 24° C. and gaseous ammonia to a reaction vessel containing a slurry of composition 45% P$_2$O$_5$, 14% H$_2$O and N:P atomic ratio 1.3 to 1.4 at 114° C. Part of the hot slurry, substantially equivalent to that produced by the reaction of the added phosphoric acid and ammonia overflows from the reaction vessel into one end of a trough mixer to a level below that of its rotating shaft. Sufficient 47.5% P$_2$O$_5$ "wet-process" phosphoric acid at 66° C. is also introduced at said end of the trough mixer to produce an overall N:P atomic ratio of 0.95. The product of this reaction solidifies as it passes along the mixer and is repeatedly broken up and has fresh surfaces exposed by the action of the blades on the rotating shaft which thus assists release of moisture which is carried off by overhead venting giving the aforementioned final solid product at 69° C. containing 9.6% H$_2$O. All parts are parts by weight.

*Example II*

An ammonium phosphate-containing product, solid at ambient temperatures, of average composition 18.0% N, 35.7% P$_2$O$_5$ and 4.4% H$_2$O and N:P atomic ratio 1.0 is made as follows at a rate of approximately 0.5 tons per hour. Gaseous ammonia and "wet-process" phosphoric acid, containing 47% P$_2$O$_5$ and having an N:P atomic ratio of 0.1, are added to a reaction vessel containing a slurry of composition 46.3% P$_2$O$_5$, 13.8% H$_2$O and having an N:P atomic ratio of 1.3 at 114° C., said ammonia and acid being added in such proportions as to give more slurry of said composition. 908 lbs. per hour of said slurry, substantially equivalent to the phosphoric acid and ammonia added per hour, overflows from the reaction vessel into a trough mixer, to a level below that of its rotating shaft and in which it is mixed with 404 lbs. of a solution at 80° C. containing 53.8% ammonium nitrate and 27.8% HNO$_3$ (i.e. equivalent to 60% ammoniation of nitric acid). The product of this reaction solidifies and is broken up as it passes along the mixer as in Example I to give the aforementioned final solid product at 70° C. The evolution of moisture in the mixer can be accelerated by the addition, shortly after the point of admixture of said slurry and solution, of, for example, 0.5 ton of final product.

*Example III*

A slurry at 114° C. of N:P atomic ratio 1.3, produced by ammoniation as in Example I, of a "wet-process" phosphoric acid containing 45% P$_2$O$_5$, overflows into a trough mixer to a level below that of its rotating shaft and in which it is mixed with further phosphoric acid of said P$_2$O$_5$ content to give a material of N:P atomic ratio 1.03 and moisture content 9.0% at 80° C. As this material passes along the mixer, gaseous ammonia is injected from below to give an end-product, solid at ambient temperatures, of composition 17.0% N, 46.3% P$_2$O$_5$, 3.5% H$_2$O and having an N:P atomic ratio of 1.6.

*Example IV*

An ammonium phosphate-containing product, solid at ambient temperatures and of composition 15.8% N, 45.3% P$_2$O$_5$, 10.7% SO$_4$, 3.5% H$_2$O and having an N:P atomic ratio of 1.55, is made by the mixing in a vented trough mixer of sulphuric acid (94% H$_2$SO$_4$) with a slurry at 107° C. of N:P atomic ratio 1.8, 14.7% N, 42.3% P$_2$O$_5$, 20.4% H$_2$O, produced by ammoniation, as in Example I, of a "wet-process" phosphoric acid containing 35% P$_2$O$_5$ instead of 47.5% P$_2$O$_5$.

What we claim is:

1. A process for the production of a solid product comprising ammonium phosphate of N:P atomic ratio 0.95 to 1.6, said product consisting of an intimate mixture of solid particles and saturated aqueous solution of soluble ingredients wherein the proportion of solution is less than that at which there is substantial separation of liquid from the product under a pressure of 6 p.s.i.g, said process comprising adding phosphoric acid and ammonia to an aqueous slurry of ammonium phosphate of flowable consistency at the temperature of working and having an N:P atomic ratio of between 1.2 and 1.8 in such proportions as to form more slurry of substantially the same composition and of flowable consistency, removing from the aqueous slurry of ammonium phosphate an amount substantially equivalent to that produced by the addition of the phosphoric acid and ammonia and mixing the amount removed with a second flowable material capable of ammoniation by it and in such proportions that the ammonium phosphate of the resulting product has a pre-determined and lower N:P atomic ratio than that of the original aqueous slurry of ammonium phosphate and is solid at ambient temperatures, said mixing being carried out under such conditions as to effect agitation and forward transport involving repeated exposure of fresh surfaces of the resulting mixture.

2. A process as claimed in claim 1 wherein subsequent to the mixing of the removed ammonium phosphate slurry with said second flowable material ammoniation is effected, after sufficient moisture is removed to prevent liquefaction during said ammoniation, to produce a solid end-product of desired N:P atomic ratio, whereby said desired end-product may be produced when said predetermined N:P ratio is less than required for said desired end-product.

3. A process as claimed in claim 1 wherein the second flowable material comprises at least one mineral acid.

4. A process as claimed in claim 1 wherein the second flowable material comprises phosphoric acid.

5. A process as claimed in claim 1 wherein the second flowable material comprises a mineral acid selected from the group consisting of nitric acid, sulphuric acid and mixtures thereof.

6. A process as claimed in claim 3 wherein the mineral acid is partially ammoniated.

7. A process as claimed in claim 1 wherein an ammonium salt is introduced subsequently to said removing step.

8. A process as claimed in claim 7 wherein said ammonium solt is introduced as a solid.

9. A process as claimed in claim 7 wherein said ammonium salt is introduced as a concentrated aqueous solution.

10. A process as claimed in claim 1 wherein urea is introduced subsequently to said removing step.

11. A process as claimed in claim 10 wherein the urea is introduced as a solid.

12. A process as claimed in claim 10 wherein the urea is introduced as a concentrated aqueous solution.

References Cited by the Examiner
UNITED STATES PATENTS

| | | | |
|---|---|---|---|
| 1,822,040 | 9/1931 | Klugh et al. | 23—107 |
| 1,999,926 | 4/1935 | Tramm et al. | 71—9 |
| 2,600,253 | 6/1952 | Lutz | 71—54 |
| 2,902,342 | 9/1959 | Kerley, Jr. | 71—43 |
| 2,946,655 | 7/1960 | Helm et al. | 23—107 |
| 2,963,359 | 12/1960 | Moore et al. | 71—41 |
| 2,965,471 | 12/1960 | Stassfort | 71—61 |
| 3,005,696 | 10/1961 | Hignett et al. | 71—43 |
| 3,053,622 | 9/1962 | Bostwick | 23—107 |
| 3,097,833 | 7/1963 | Harris et al. | 263—32 |

MAURICE A. BRINDISI, *Primary Examiner.*